(12) United States Patent
Thuelig

(10) Patent No.: US 7,556,227 B2
(45) Date of Patent: Jul. 7, 2009

(54) ADJUSTABLE SCREW FOOT FOR APPLIANCES

(75) Inventor: Markus Thuelig, Beckum (DE)

(73) Assignee: Miele & Cie. KG, Guetersloh (DE)

( * ) Notice: Subject to any disclaimer, the term of this patent is extended or adjusted under 35 U.S.C. 154(b) by 375 days.

(21) Appl. No.: 11/122,445

(22) Filed: May 5, 2005

(65) Prior Publication Data

US 2005/0247834 A1 Nov. 10, 2005

(30) Foreign Application Priority Data

May 5, 2004 (DE) .................... 10 2004 022 681

(51) Int. Cl.
*F16M 11/24* (2006.01)
(52) U.S. Cl. ............... 248/188.8; 248/188.4; 248/125.2
(58) Field of Classification Search ............. 248/188.4, 248/188.2, 188.5, 669, 125.1, 125.2, 125.8, 248/125.9
See application file for complete search history.

(56) References Cited

U.S. PATENT DOCUMENTS 1,073,294 A * 9/1913 Siewert ...................... 254/103
2,512,068 A * 6/1950 Mayo ............................ 33/10
2,828,578 A * 4/1958 McCabe .................. 248/188.4
4,991,805 A 2/1991 Solak et al. .............. 248/188.4
5,697,586 A * 12/1997 Lybarger ................. 248/188.4
6,279,860 B1 * 8/2001 Swanger .................. 248/125.2

FOREIGN PATENT DOCUMENTS

DE 8908536 9/1989
EP 0503701 9/1992

OTHER PUBLICATIONS

European Search Report for European Patent No. EP 1 593 902 mailed Nov. 22, 2005.

* cited by examiner

*Primary Examiner*—J. Allen Shriver
*Assistant Examiner*—Steven Marsh
(74) *Attorney, Agent, or Firm*—Darby & Darby

(57) ABSTRACT

A foot for adjusting the height of an appliance such as, for instance, a dishwasher or washing machine, provided with a threaded shank and a sprocket seated thereon for rotation relative thereto. The sprocket may be shifted between a first orientation in which the shank may be rotated while the sprocket is secured against rotation to adjust the height of the appliance by translatory movement of the shank and a second orientation in which the sprocket may be rotated and the shank is secured against rotation but is free to move axially.

5 Claims, 3 Drawing Sheets

ADJUSTABLE SCREW FOOT FOR APPLIANCES

BACKGROUND OF THE INVENTION

1. Field of the Invention

The invention, in general, relates to a novel screw foot of the kind used for leveling, or adjusting the height of, household appliances such as, for instance, washing machines, dryers, dishwashers, refrigerators and the like (hereinafter sometimes collectively referred to as "appliance") and, more particularly, to an adjustable screw foot provided with a shank which over its longitudinal extent is provided with a thread cooperating with the interior thread of a sprocket mounted for rotation relative to the appliance and operatively connected, by way of an adjustment rod, to a toothed gear such that motion of the toothed gear causes the rotationally secured shank of the foot to exercise a translatory movement.

In household appliances and, more particularly, dishwashers, a distinction is made between so-called free-standing dishwashers and dishwashers integrated into wall cabinets of a kitchen or other suitable space. Either type of appliance is provided with feet adapted to adjustable its height or level it relative to a support surface so as to ensure the stationary stability of the appliance on an uneven surface. Thus, for adjusting their height, dishwashers integrated into a cabinet are provided at their rear end with feet which may be adjusted from the front of the machine by means of an adjustment rod.

2. The Prior Art

A foot on the kind adjustable in this manner from the font of the appliance has been disclosed by U.S. Pat. No. 4,991, 805-Solak et al. The foot is provided with a shank which at its free end is provided with a support plate. The shank is externally threaded over its length and cooperates with the interior thread of a toothed wheel. The toothed wheel is rotatably supported relative to the housing of the appliance so that the supporting force is transmitted to the housing by way of the toothed wheel. A sprocket is operatively connected to the toothed wheel so that rotation of the sprocket causes the rotationally secured shank of the foot to go through a translatory movement.

Thus, if the dishwasher has been inserted into a kitchen cabinet, the otherwise unaccessible foot may be moved from the front of the dishwasher to bring about a heightwise adjustment thereof and to align it and provide the requisite stationary stability.

The disadvantage of this prior art feature is believed to be that the height of its foot can only be adjusted by a sprocket connected to an adjustment rod. It is not possible, however, to adjust the foot by direct access thereto as would be the case in a free-standing appliance, without the sprocket and adjustment rod.

OBJECT OF THE INVENTION

It is a primary object of the invention to provide a feature which would allow heightwise adjustment of the foot of an appliance by direct action.

Another object is to provide an arrangement which can be converted between direct and indirect height adjustment of a household appliance.

Other objects will in part be obvious and will in part appear hereinafter.

BRIEF SUMMARY OF THE INVENTION

In accordance with the invention, the objects are accomplished by a height-adjustable foot provided with first and second members rotatable relative to each other and a third member for reversing the relative rotatability of the first and second members.

Advantageously, the height-adjustable foot is provided with an externally threaded shank provided with an axially extending external groove and cooperating with an internally threaded sprocket which is adjustable between first and second positions and which in its first position engages an appliance housing for rotation relative thereto and is rotatable by a toothed wheel connected to an adjustment rod such that rotation of the sprocket results in translatory movement of the shank, the adjustment rod having a free end extending through the toothed wheel and protruding into the axially extending groove to prevent rotation of the shank, and which in its second position is secured against rotation relative to the appliance housing with the foot being freely rotatable within the sprocket.

The advantages yielded by the invention in essence are that structural groups of household appliances such as dishwashers and washing machines hitherto equipped with different height-adjustable feet and may now be provided with but one type of foot.

For this purpose it is proposed to extend a free end of an adjustment rod through a toothed wheel and into an axial groove in the exterior surface of a threaded shank seated in an internal thread of a sprocket meshing with the toothed wheel so that the shank is secured against rotation but exercises a translatory movement upon rotation of the toothed wheel. In another orientation of the sprocket is prevented from rotating and no longer meshes with the toothed wheel, the free end of the adjustment rod is removed from the axial groove and the treaded shank may be rotated directly.

In an advantageous embodiment of the invention, the housing of the appliance is provided with a chamber-like area into which the sprocket may be inserted in either its first or second orientation. If the sprocket is to provide for direct of indirect height adjustment of the appliance, it simply needs to be placed in the chamber in its appropriate orientation.

The sprocket is mounted in the chamber such that for an indirect height adjustment of the appliance it is freely rotatable while the threaded shank of the foot is prevented from rotating and that for a direct height adjustment the sprocket is secured against rotation while the threaded shank may be rotated. Free rotation and locking of the sprocket are made possible by the configuration of axial shoulders at opposite ends of the sprocket. The shoulder at one end of the sprocket is provided with flanks which are engaged by abutments in the chamber-like area. The shoulder at the other end of the sprocket is of sufficient length to clear the abutments. Shifting the sprocket between its two orientations is accomplished by changing its orientation on the threaded shank by 180°.

DESCRIPTION OF THE SEVERAL DRAWINGS

The novel features which are considered to be characteristic of the invention are set forth with particularity in the appended claims. The invention itself, however, in respect of its structure, construction and lay-out as well as manufacturing techniques, together with other objects and advantages thereof, will be best understood from the following description of preferred embodiments when read in connection with the appended drawings, in which:

DETAILED DESCRIPTION OF THE PREFERRED EMBODIMENT

Figure 1:
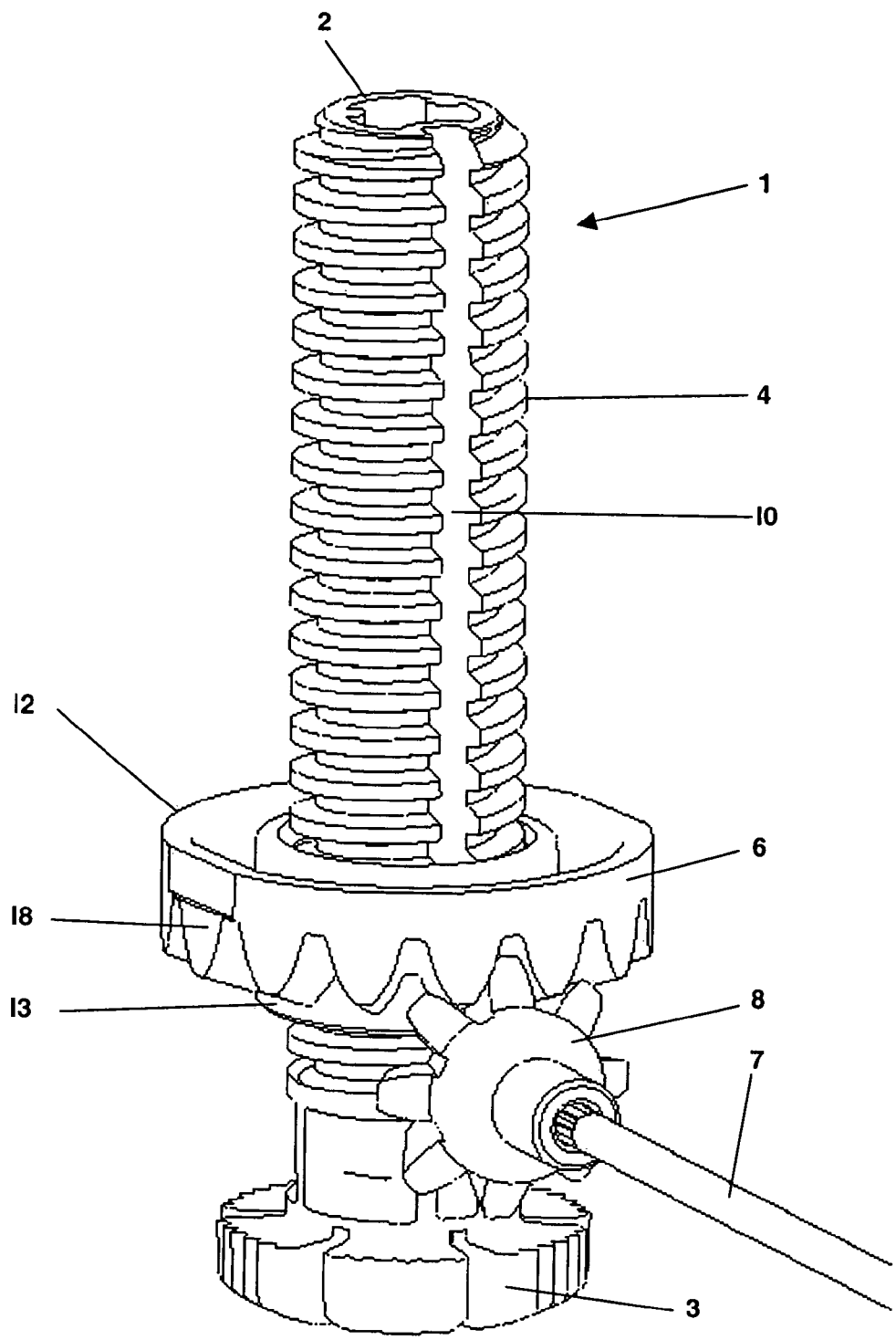
FIG. 1 is a perspective view of the height-adjustable foot in accordance with the invention.
Figure 2:
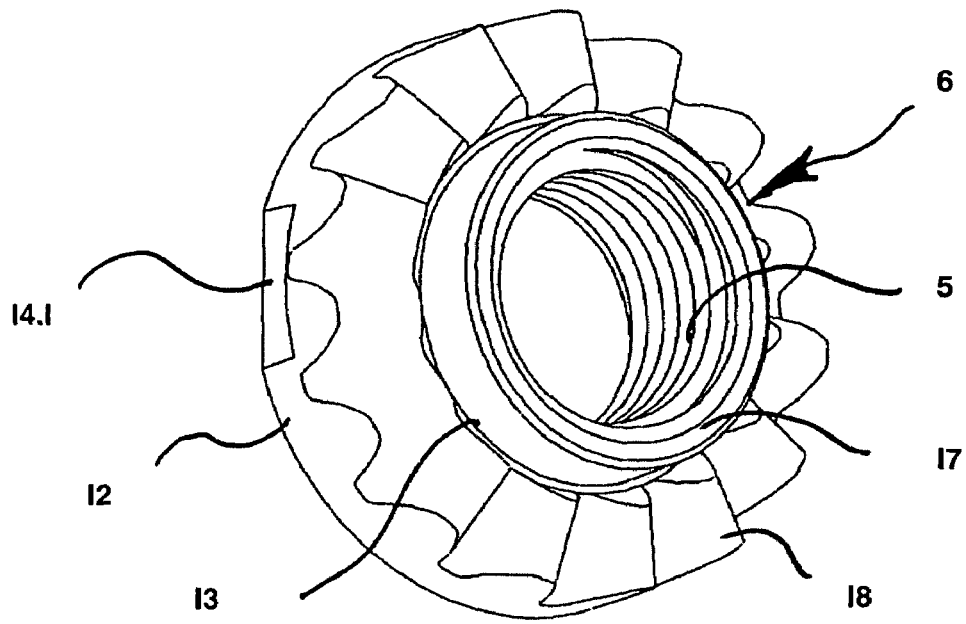
FIG. 2 is a perspective view, in planar elevation, of a sprocket.

FIG. 1 is an isolated representation of an adjustable foot 1 for household appliances, such as, for instance, washing machines or dishwashers, constituted by a shank 2 which, as shown in FIG. 1, at its free end is provided with an integral support disc 3. As shown in FIG. 1, the exterior of the shank 2 is provided over its longitudinal extent with a thread 4 which cooperates with an interior thread 5 of a sprocket 6. The sprocket 6 is shown in greater detail in FIG. 2 depicting the sprocket 6 in perspective. As shown, the teeth of the sprocket 6 are cut into one of its axial surfaces. The opposite plane axial surface of the sprocket 6 engages a plane surface of the housing of the appliance (not shown), and its teeth mesh with a toothed gear 8 affixed to an adjustment rod 7. Thus, rotating the gear 8 by way of the rod 7 causes the shank 2 of the foot 1 which is secured against rotating to move axially with respect to the housing of the appliance and, depending upon the direction of the movement, causes the housing to be raised or lowered.

Figure 3:
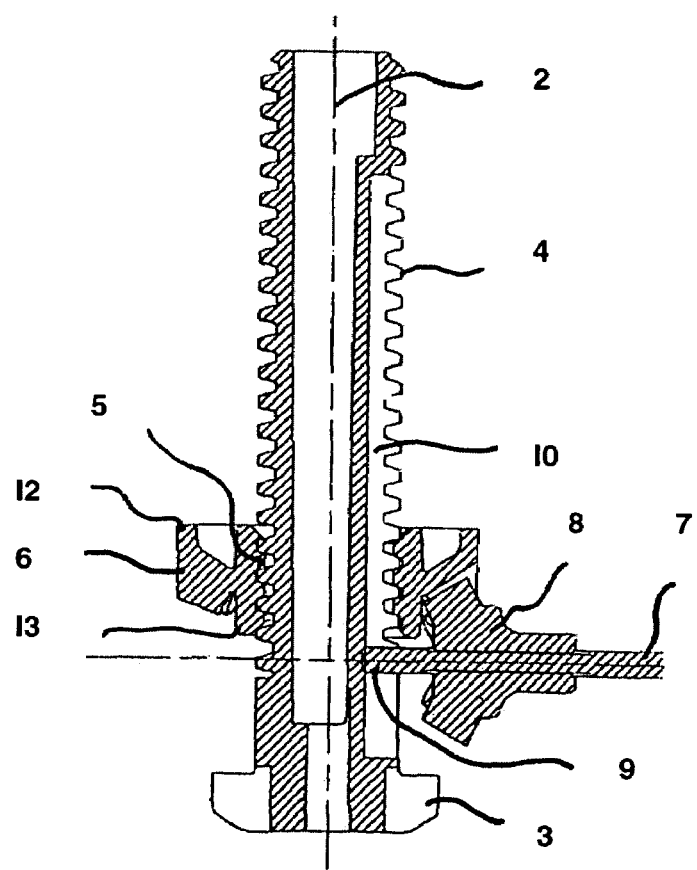
FIG. 3 is a view in longitudinal section of the directly adjustable foot.

As may be seen in the sectional representation of FIG. 3, a free end 9 of the adjustment rod 7 is extending beyond the gear 8 and is protruding into a longitudinal groove 10 cut into, and extending axially of, the shank 2 so that the shank 2 is secured against rotary movement and may be move axially relative to the appliance housing and to the sprocket 6 in a first position thereof. The longitudinal groove 10 does not extend to the end of the shank 2 to prevent it from moving out of the sprocket 8.

Figure 4:
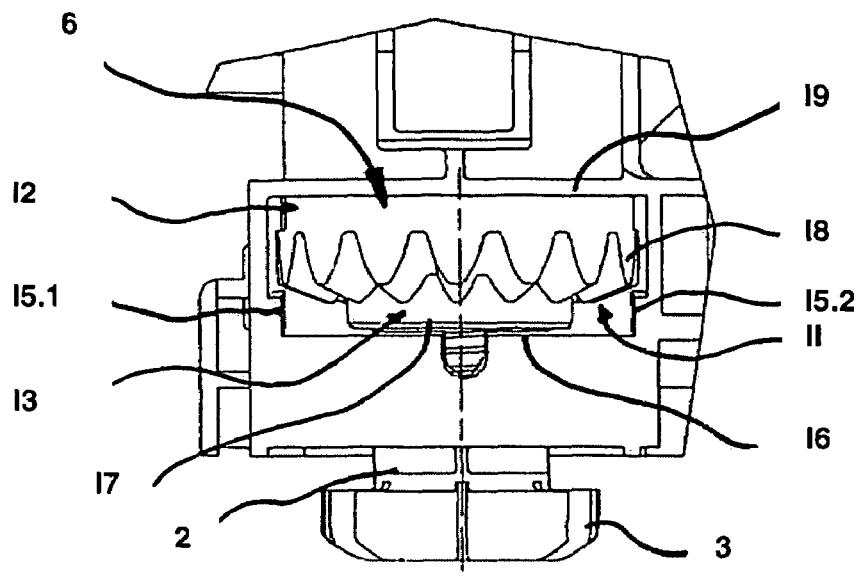
FIG. 4 is detailed view of the sprocket in a first position for direct adjustment.
Figure 5:
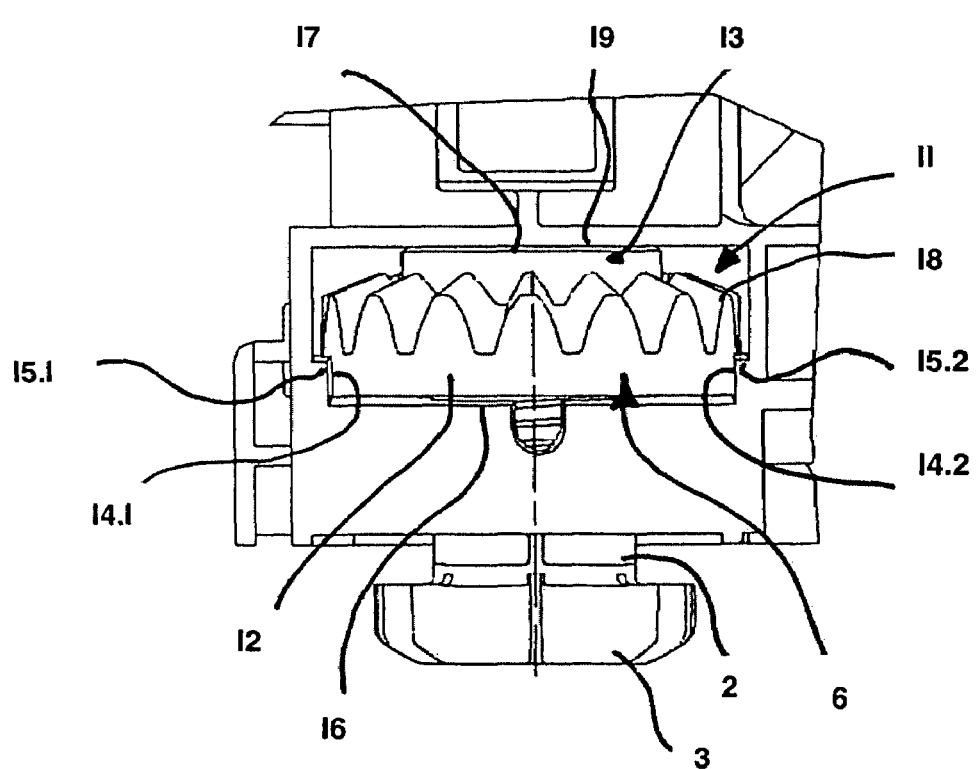
FIG. 5 is a further view of the sprocket in a second position for the direct adjustment of the shank.

FIG. 5 depicts the sprocket 6 in a second position which allows direct adjustment of the shank 2 by simply reversing the sprocket 6 by 180° into its second position. As more clearly shown in FIGS. 4 and 5, there is provided a chamber-like area 11 in the housing of the appliance into which the sprocket 6 may be moved from the exterior, either into its first position (FIG. 4) or second position (FIG. 5). As will become clear from looking at FIGS. 4 and 5, the sprocket 6 is installed in the chamber 11 such that for an indirect adjustment it is journaled for free rotation, and for a direct adjustment it is locked in the chamber 11 (FIG. 5).

For this purpose, the sprocket 6 is provided with an upper shoulder 12 and a lower shoulder 13. The upper shoulder 12 is adapted to assume a locking connection with the chamber 11 whereas the lower shoulder 13 allows the sprocket 6 to be rotated (FIG. 4) within the chamber 11. The individual view of the sprocket 6 in FIG. 2 shows the upper shoulder 12 to be provided, in its circular periphery, with planar areas or flanks 14.1 and 14.2 which move into locking engagement with steps 15.1 and 15.2 formed in the chamber 11. FIG. 5 shows the steps 15.1 and 15.2 cooperate with the flanks 14.1. and 14.2 of the upper shoulder 12 in the manner of an open-mouthed wrench or spanner. It will thus be understood that this position results in locking the sprocket 6 against rotation.

Reversing the sprocket 6 by 180° results in engagement of the lower shoulder 13 with the bottom 16 of the chamber 12. The lower shoulder 13 is structured as a sleeve 17 and, as may be seen in FIG. 4, its axial extent exceeds the height of the steps 15.1 and 15.2 in the chamber 11. Thus, the teeth 18 are above the reach of the steps 15.1 and 15.2 and ensure free rotation of the sprocket 6.

In order securely to support the sprocket 6 within the chamber 11, the height of its structure of the sprocket 6, including the upper and lower shoulders 12 and 13, substantially equals the depth of the chamber 11 so that the bottom area 19 of the chamber 11 securely supports the sprocket 6 in its positions for a direct as well as indirect adjustment. This secure support is transmitted to the foot 7.

It will be understood by those skilled in the art that by disassembling the adjustment rod 7 and the gear 8 and by unscrewing the shank 2 from the internal thread of the sprocket 6, the sprocket 6 may be removed from the chamber 11 to be reinserted therein in a reversed orientation to assume its locked position within the chamber 11. In this position, the foot 7 may be rotated by direct action in either direction.

What is claimed is:

1. A height-adjustable foot for an appliance, comprising:
    an externally threaded shank provided with an elongate axial groove in the peripheral surface thereof;
    a sprocket provided with a threaded axial bore seated on the shank and shiftable between a first orientation in which the sprocket is secured against rotation and a second orientation in which the sprocket is free to rotate;
    a first axial shoulder at one end of the sprocket provided with means for preventing rotation of the sprocket in the first orientation thereof;
    a second shoulder at the opposite end of the sprocket for allowing rotation of the sprocket in the second orientation thereof; and
    a rod extending angularly of the shank and protruding into the elongate groove thereof and configured to secure the shank against rotation when the sprocket is in its second orientation.

2. The foot of claim 1, wherein the means for preventing rotation of the sprocket comprises at least one irregularity in the surface of the first axial shoulder cooperating with a complementary external element.

3. The foot of claim 2, wherein the external element comprises an abutment in the appliance aligned with the irregularity in the first orientation of the sprocket.

4. The foot of claim 1, wherein the rod is mounted for rotation and has a sprocket wheel affixed thereto for selectively rotating the sprocket.

5. The foot of claim 1, further comprising a support disc affixed to a free end of the shank.

* * * * *